US010013636B2

(12) United States Patent
Gan et al.

(10) Patent No.: US 10,013,636 B2
(45) Date of Patent: Jul. 3, 2018

(54) IMAGE OBJECT CATEGORY RECOGNITION METHOD AND DEVICE

(71) Applicants: BEIJING JINGDONG SHANGKE INFORMATION TECHNOLOGY CO, LTD., Beijing (CN); BEIJING JINGDONG CENTURY TRADING CO., LTD., Beijing (CN)

(72) Inventors: Yongzhou Gan, Beijing (CN); Zhengping Deng, Beijing (CN)

(73) Assignees: Beijing Jingdong Shangke Information Technology Co., Ltd., Haidian District, Beijing (CN); Beijing Jingdong Century Trading Co., Ltd., Beijing (CN)

( * ) Notice: Subject to any disclaimer, the term of this patent is extended or adjusted under 35 U.S.C. 154(b) by 203 days.

(21) Appl. No.: 15/032,460

(22) PCT Filed: Sep. 26, 2014

(86) PCT No.: PCT/CN2014/087623
§ 371 (c)(1),
(2) Date: Apr. 27, 2016

(87) PCT Pub. No.: WO2015/062384
PCT Pub. Date: May 7, 2015

(65) Prior Publication Data
US 2016/0267359 A1 Sep. 15, 2016

(30) Foreign Application Priority Data
Nov. 4, 2013 (CN) .......................... 2013 1 0537562

(51) Int. Cl.
*G06T 3/40* (2006.01)
*G06K 9/62* (2006.01)
(Continued)

(52) U.S. Cl.
CPC ......... *G06K 9/6223* (2013.01); *G06K 9/4671* (2013.01); *G06K 9/627* (2013.01);
(Continued)

(58) Field of Classification Search
None
See application file for complete search history.

(56) References Cited

U.S. PATENT DOCUMENTS

| 2009/0285490 A1* | 11/2009 | Hotta | G06K 9/6255 |
| | | | 382/195 |
| 2011/0158535 A1* | 6/2011 | Iio | G06K 9/4642 |
| | | | 382/190 |

(Continued)

FOREIGN PATENT DOCUMENTS

| CN | 101807259 A | 8/2010 |
| CN | 102609719 A | 7/2012 |

(Continued)

OTHER PUBLICATIONS

MacQueen, J. B., "Some methods for classification and analysis of multivariate observations", in Proc. 5th Berkeley Symposium. Mathematical Statistics and Probability, 1967, pp. 281-297, University of California, Los Angeles, CA.
(Continued)

*Primary Examiner* — Kim Vu
*Assistant Examiner* — Nathan Bloom
(74) *Attorney, Agent, or Firm* — Michael Best & Friedrich LLP (57) ABSTRACT

The present invention relates to an image object category recognition method and device. The recognition method comprises an off-line autonomous learning process of a computer, which mainly comprises the following steps: image feature extracting, cluster analyzing and acquisition of an average image of object categories. In addition, the
(Continued)

method of the present invention also comprises an on-line automatic category recognition process. The present invention can significantly reduce the amount of computation, reduce computation errors and improve the recognition accuracy significantly in the recognition process.

15 Claims, 5 Drawing Sheets

(51) Int. Cl.
  *G06K 9/46* (2006.01)
  *G06N 3/08* (2006.01)

(52) U.S. Cl.
  CPC ......... *G06K 9/6215* (2013.01); *G06K 9/6228* (2013.01); *G06K 9/6255* (2013.01); *G06N 3/088* (2013.01); *G06T 3/4023* (2013.01); *G06T 2207/20024* (2013.01); *G06T 2207/30242* (2013.01)

(56) References Cited

U.S. PATENT DOCUMENTS

| | | | | |
|---|---|---|---|---|
| 2012/0082385 A1* | 4/2012 | Xu | ............... | G06K 9/6857 382/199 |
| 2012/0269441 A1* | 10/2012 | Marchesotti | ......... | G06N 99/005 382/195 |
| 2013/0238626 A1* | 9/2013 | Denney | ............ | G06F 17/30244 707/737 |
| 2013/0315477 A1* | 11/2013 | Murray | ............. | G06F 17/30265 382/159 |

FOREIGN PATENT DOCUMENTS

| | | |
|---|---|---|
| CN | 102930296 A | 2/2013 |
| CN | 103345645 A | 10/2013 |
| CN | 103559504 A | 2/2014 |
| WO | 2015062384 A1 | 5/2015 |

OTHER PUBLICATIONS

International Search Report with English translation for Application No. PCT/CN2014/087623 dated Dec. 22, 2014 (11 pages).

\* cited by examiner

IMAGE OBJECT CATEGORY RECOGNITION METHOD AND DEVICE

TECHNICAL FIELD

The present invention relates to digital image processing with a computer, and more particularly relates to a novel image object category recognition method and device.

BACKGROUND ART

With the development of digital media, the amount of digital images has grown exponentially; especially in electronic Internet, all details of commodities for sale are exhibited with images of the commodities, wherein the images with rich semantic contents replace descriptions of the details of the commodities. So the amount of images is being increasing. And how to categorize a large scale of image data according to the commodities described in the images becomes an urgent problem.

Existing image object category recognition methods mostly use machine learning methods. In practice, parameters in a majority of learning models are obtained through training samples, and have uncertainties. At the same time, due to differences in the training samples, classification models will produce errors, and errors and error rates are present in attribution of the object category. In addition, although part of the framework for object recognition using a multi-layer structure improves recognition accuracy, it requires a lot of resources and spends a lot of time in recognizing category.

SUMMARY OF THE INVENTION

The present invention provides a novel image object category recognition method and device designed to solve the following problems in existing image category recognition methods: 1) In the existing image object category recognition method by means of classification model parameter estimation, the parameters are obtained through training samples and have uncertainty; 2) due to differences in the training samples, classification models will produce errors, and errors and error rates are present in attribution of the object category, failing to realize accurate recognition of an image object category; 3) the image object category recognition is low in accuracy and slow in speed.

The method and device of the present invention starts from low-level visual features of images. The constructed learning modules can find out general commonness among images for each object category, and meanwhile can distinguish different categories largely to realize accurate image object category recognition while enhancing accuracy and speed of image object category recognition.

The present invention first extracts key feature points from all sampling images, reducing the amount of computation significantly by means a clustering algorithm, a search algorithm, etc. Further use of an image feature commonness extracting method reduces the amount of computation while enhancing the image recognizing accuracy.

The technical solution of the present invention is as follows.

The present invention includes an image object category recognition method, comprising the following steps:

an image feature extracting step (S1) of extracting feature points of all sampling images in N known categories with a feature point extracting method, and establishing a known category—sampling image—feature point correspondence, where N is a natural number greater than 1, each category comprises at least one sampling image;

a cluster analyzing step (S2) of performing cluster analysis on all of the feature points extracted using a clustering algorithm, and dividing the feature points into N subsets;

an object category determining step (S3) of determining an object category $C_n$ for each of the subsets; and a common feature acquiring step (S4) of acquiring common features among the images in each object category $C_n$ with a search algorithm, where $c_n$ is the $n^{th}$ object category, and n is a positive integer no more than N.

The method, after the step S4, can further comprise an on-line image recognizing and categorizing step S5 of recognizing and automatically categorizing an image to be categorized, the one-line image recognizing and categorizing step S5 comprising:

S502 of performing the same image feature extracting processing on the image to be categorized as the step S1 to extract feature points of the image to be categorized;

S503 of comparing the feature points extracted from the image to be categorized with each of the common features of the each object category $C_n$ among the n object categories to compute similarity between the image to be categorized and each object category respectively;

S504 of attributing the image to be categorized to an object category $C_n$ having the greatest similarity.

The present invention further comprises an image object category recognition device, the device comprising:

an image feature extracting unit configured to extract feature points of all sampling images in N known categories with a feature point extracting method and establish a known category—sampling image—feature point correspondence, where N is a natural number greater than 1, each category comprises at least one sampling image;

a cluster analyzing unit configured to perform cluster analysis on all of the feature points extracted using a clustering algorithm, and dividing the feature points into N subsets;

a determining unit for determining an object category $C_n$ for each of the subsets; and an acquiring unit for acquiring common features among the images in each object category c with a search algorithm, where $C_n$ is the $n^{th}$ object category, and n is a positive integer no more than N.

The present invention also relates to a method for categorizing automatically an image to be categorized with the image object category recognition method according to claim 1, comprising the following steps of:

an extracting step of performing the same image feature extracting processing on the image to be categorized as the step S1 to extract low-level visual features from the image to be categorized;

a comparing and computing step of comparing each feature point extracted from the image to be categorized with each feature point in a set of common feature points for each object category or in average images of each object category one by one with an image similarity measure algorithm to compute similarity between the feature points of the image to be categorized and the feature points of each object category; and an attributing step of attributing the image to be categorized to an object category having the greatest similarity.

The present invention further relates to an image recognition system comprising at least a processor configured to comprise at least the following functional units:

an image feature extracting unit configured to extract feature points of all sampling images in N known categories with a feature point extracting method, where N is a natural number greater than 1, each category comprises at least one sampling image, and a known category—sampling image—feature point correspondence is established;

a cluster analyzing unit configured to perform cluster analysis on all of the feature points extracted using a clustering algorithm, and dividing the feature points into N subsets;

a determining unit for determining an object category $C_n$ for each of the subsets; and an acquiring unit for searching common features among the images in each object category $C_n$ with a search algorithm, where $C_n$ is the $n^{th}$ object category, and n is a positive integer no more than N.

The embodiments of the present invention have obtained the following beneficial effects:

1. A computer extracts and analyzes automatically features of the object category of sampling images, autonomously learns and categorizes the sampling images, and recognizes automatically the category of the image to be recognized based upon the result of autonomous learning and categorization.

2. Screening representing images of the object category reduces impact of a particular image with a relatively great difference in the object category on recognition of the entire object category while enhancing extraction of common features from common images in the object category. The concept of constructing a k-tree ensures spatial relevance among object categories with similar commonness to a large extent.

3. By learning average images of the object category, the recognition rate is increased. Besides, in the object recognizing process, determining thresholds for different object categories according to characteristics of different object categories eliminates greatly influence of using an uniform criteria on part of object categories, reduces errors in recognition and increases recognition accuracy.

DETAILED DESCRIPTION OF THE INVENTION

In order to clarify the object, technical solution and advantages, the present invention will be further described in detail with the following accompanying drawings and specific embodiments. The drawings illustrate only typical modes implementing the present invention. The present invention may be implemented in different forms and should not be construed as limited to the particular implementing modes described or illustrated herein. These embodiments are provided just to make the disclosure be sufficient and comprehensive. Throughout the text, the same reference signs correspond to the same members or elements. For the same elements in each of the drawings, explanations will not be repeated. Use of "including" and "comprising" and its variants as used herein mean including the elements listed thereafter and the equivalents thereof as well as additional elements.

In addition, it should be understood that the embodiments of the present invention, including hardware, software, firmware, and electronic components or modules, etc., may be illustrated and described in a way that most of the parts are implemented uniquely in hardware for the purpose of discussion. However, based on the detailed descriptions herein those skilled in the art will recognize that in at least one embodiment, one aspect of the present invention based on the electronic device may be implemented in a manner of software or firmware. It should also be noted that a plurality of devices based on hardware, software and firmware and a plurality of different structural components can be used in implementing the present invention. Moreover, as described in the following paragraphs, the specific mechanical configuration as illustrated in the drawings is listed as an example of the embodiments of the present invention, and other alternative configurations are also possible.

Those skilled in the art can provide appropriate software environment easily to assist in realizing the present invention by use of teaching provided herein and programming languages and tools, such as Java, Pascal, C++, C, database language, API, SDK, compilation, firmware, microcode, and/or the like.

Preferred embodiments according to the present invention will now be depicted with reference to the implementing modes of image processing. In practice, the present invention can process various images such as color, black and white, or gray scale, etc.

The method according to the application can be divided into two parts. Part I is a computer autonomous training and learning process, and Part II is an automatic category recognizing process. These two parts can both be executed or implemented offline or online. Offline herein refers to a process in which independent from a network system, a computer performs an autonomous learning of the object category for an image; and online means a process in which automatic object category recognition for an image to be categorized that have been obtained is performed in practical application, especially in network environment. These two parts can be performed independent from each other.

In Part I, first, a representative set of sampling images for each category is selected respectively from a set of known sampling images (products or commodities, etc.) that have been categorized into known categories (e.g., N known categories) explicitly, each set of sampling images includes at least one sampling image containing typical features of the known category. By parsing these representative sets of sampling images with a computer respectively, feature commonness of each set of sampling images for each known category is extracted therefrom to establish a correspondence among the known category, the sampling image, and the feature point, and the computer is caused to retrieve (compute) autonomously common features or average images among the set of sampling images for each object category based upon the correspondence.

In Part II, using the common features or average images of each object category obtained in Part I as the comparison reference used in participating in an online object category recognizing process to preform automatic category recognition for the images to be categorized. If the common features of the sampling images for each object category have been obtained by use of other methods, the automatic recognizing process of the Part II can be performed directly with Part I omitted.

The specific implementing modes for each part will be depicted in detail.

Figure 1:
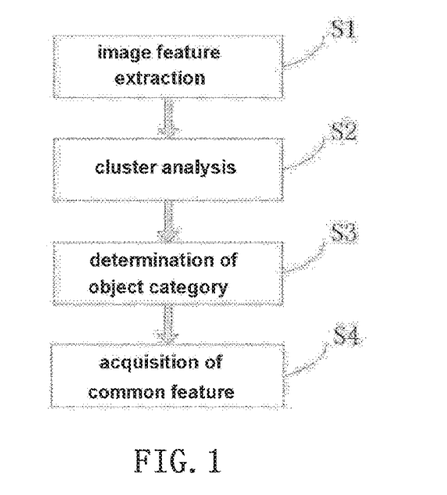
FIG. 1 is a main flowchart of the image object category recognition method based on an off-line (Part I) computer autonomous learning model of the present invention.

FIG. 1 is a main flowchart of Part I of the image object category recognition method.

In Part I, the main purpose is to have the computer learn autonomously to extract common features from a known set of sampling images for each known category. Part I mainly includes, but is not limited to the following steps: an image feature extracting step; a cluster analyzing step; and an object category determining and a set of common feature points searching step, etc. (see FIG. 1).

First, each specific category (such as TV, refrigerator, etc.) in sets of images for N (N is a natural number greater than 1) known categories has been determined by labor or other means, and each category has its own set of images. Each set of images includes at least one sampling image, whereby a correspondence between each known category and each set of sampling images or even each image (hereinafter the "known category—set of sampling images correspondence table") can be established.

Because a subjective judgment and recognizing process to a certain image with a human eye is completely different from the judgment and recognizing principle as to the same image with a computer, the recognition results may be far away from each other. For allowing the computer to obtain an recognition result similar with a human eye, it is necessary to "train" the computer first and have it "learn" to categorize and recognize images autonomously.

Figure 2:
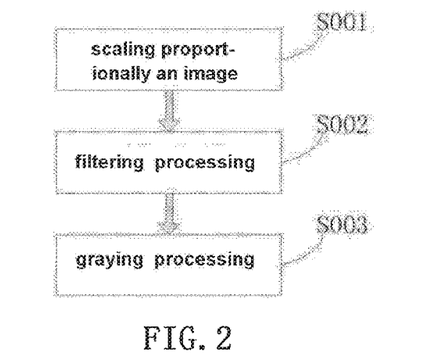
FIG. 2 is a flowchart of performing an image preprocessing according to the present invention.

In order to train the computer to learn autonomously common features of a set of images for each known category and obtain accurate depictions for each known category, the present invention analyzes a set of sampling images for each category with a computer first to retrieve (compute) feature depictions of each image in the set of sampling images for each category. To this end, Part I of the present invention may include, but is not limited to the following steps:
Preprocessing Step Prior to image analysis, in order to reduce the amount of computation and/or remove noise from an image, a necessary preprocessing of the image is often needed. However, the preprocessing step is not mandatory, and can be omitted as long as the image to be analyzed can meet the requirements for feature extraction. With reference to FIG. 2, for a color image for example, the image preprocessing step of the present embodiment include, but is not limited to: scaling proportionally the image to reduce the amount of computation; removing part or all noise by filtering means; graying processing, etc. And in dealing with black and white images, graying processing, etc. can be omitted.

The specific preprocessing step can be implemented with the following sub-steps:

Step S001: scaling proportionally a color image according to formula (1.1):

$$\begin{cases} \text{if } (W > T) \\ \text{scale} = W/T, W' = T, H' = H/\text{scale}; \\ \text{if } (H > T) \\ \text{scale} = W/T, H' = T, W' = W/\text{scale}; \end{cases} \quad (1.1)$$

wherein W, H represent the width and height of the original image before scaling, W',H' represent the width and height of the image scaled proportionally, scale represents the scaling, and T is the threshold for the scaling proportionally. In the present invention, in measurement unit of pixel, you can set the threshold T∈[500,800]. Through multiple experiments, an inventor found out when the threshold is within the range, the result is optimal; especially, when T=600, an image can be scaled to an appropriate size, and no influence is produced on further image processing and recognition with the computation efficiency improved.

Then according to the formula (1.2), an x-direction linear interpolation is made to the original image, and then a y-direction linear interpolation is made according to the formula (1.3) to obtain an image scaled proportionally:

$$f(R_1) \approx \frac{x_2 - x}{x_2 - x_1} f(Q_{11}) + \frac{x - x_1}{x_2 - x_1} f(Q_{21}), \text{ where} \quad (1.2)$$

$$R_1 = (x, y_1);$$

$$f(R_2) \approx \frac{x_2 - x}{x_2 - x_1} f(Q_{12}) + \frac{x - x_1}{x_2 - x_1} f(Q_{22}), \text{ where}$$

$$R_2 = (x, y_2);$$

$$f(P) \approx \frac{y_2 - y}{y_2 - y_1} f(R_1) + \frac{y - y_1}{y_2 - y_1} f(R_2), \quad (1.3)$$

wherein, $R_1$ and $R_2$ represent the X-direction linear interpolated pixels, x, y, x1, y1, x2, y2 are the coordinates of the pixels in the image, f (*, *) represents the color value of the pixels, $Q_{11}=(x_1, y_1)$ $Q_{12}=(x_1, y_2)$, $Q_{21}=(x_2, y_1)$ $Q_{22}=(x_2, y_2)$ represent the four points in the original image that participate in the scaling computation, and P represents the Y-direction linear interpolated point. In the present embodiment, the image scaled proportionally is obtained after the Y-direction linear interpolation.

Step S002: performing the following bilateral filtering processing according to formula (1.4) to the image scaled proportionally in step S001:

$$h(x) = k^{-1}(x) \int_{-\infty}^{\infty} \int_{-\infty}^{\infty} f(\xi) c(\xi, x) s(f(\xi), f(x)) d\xi \quad (1.4),$$

wherein f(x) is an input image, h(x) is an output image, c(ξ, x) measures the geometric proximity degree between the threshold center x and its adjacent point ξ, s(f(ξ), f(x)) measures the luminosity similarity of the pixels between the threshold center x and its adjacent point ξ, and k is a normalized parameter. In a smooth region, the bilateral filter is embodied as a standard network domain filter that filters out noise by a smoothing processing, such as removing out notable mutative isolated pixels, etc.

Then graying operation is performed to the input color image according to formula (1.5). This step may be omitted when the SIFT algorithm is not used.

$$Y=0.299*R+0.587*G+0.114*B \quad (1.5),$$

wherein Y represents the pixel value of the current pixel after conversion, R represents the red value of the current pixel, G represents the green value of the current pixel, and B represents the blue value of the current pixel.

Preprocessing methods or devices that can meet the image feature extraction requirements in the prior art can be used in any form for preprocessing of an image.

Feature Extracting Step S1

After the selective preprocessing of the image, step S1 is proceeded with (see FIG. 1 and FIG. 3): extracting its respective feature depiction of each image in a known set of sampling images for each category.

Specific to the embodiments of the present invention, a method of extracting an low-level visual feature (see FIG. 3) can be used to extract each key feature point from each image in each set of sampling images (step S101), and compute (obtain) a vector depiction, i.e., a descriptor, of each key feature point (step S102). In the embodiment, the process of extracting the low-level visual feature from an image is depicted using a SIFT algorithm as an example.

Figure 3:
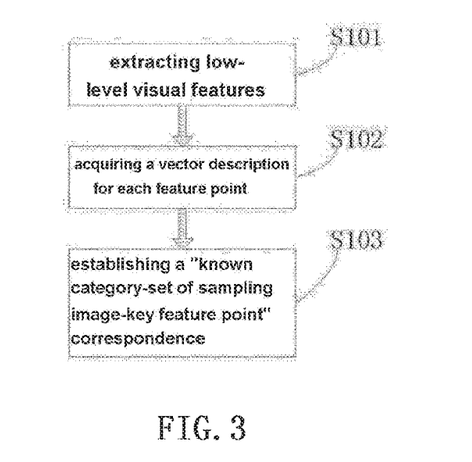
FIG. 3 is a detailed flowchart of the image low-level visual feature extracting method according to one embodiment of the present invention.

The low-level visual feature extracting step can be implemented through the following sub-steps:

Step S101: extracting low-level visual features from a preprocessed image. For example, the low-level visual feature extraction may be performed using a SIFT (Scale Invariant Feature Transform) algorithm. The SIFT algorithm is put forward by D. G. Lowe in 1999 and perfected and summarized in 2004. The paper was published in IJCV: David G. Lowe, "Distinctive image features from scale-invariant key points", International Journal of Computer Vision, 60, 2 (2004), pp. 91-110. The contents thereof in its entirety are incorporated into the document by citation and reference.

The SIFT key feature points and the descriptors (i.e., the vector expressions of feature points) of the key feature points can be computed with a commonly known and used method. And the steps S101 and S102 can be done in one computing step or functional unit.

Through the low-level visual feature extraction, a computer may retrieve (i.e., compute) each key feature point having notable characteristic in each image and its corresponding descriptor. Subsequently, a "known category—set of sampling images—key feature point (i.e., descriptor)" correspondence (see Table 1) is further established (step S103) based upon the "known category—set of sampling images" correspondence table previously established. Based upon the correspondence (table), the computer can identify the numbers of the key feature points included in each category and even in each sampling image and of the descriptors and the correspondence therebeween. The correspondence table can also be established simultaneously when or after each key feature point is computed. Therefore, step S103 can be performed in parallel to or sequentially after the steps S101 and/or step S102, and the correspondence table may be stored in a corresponding memory according to needs.)

TABLE 1

| Known category No. | Set of sampling images | Key feature point (descriptor) |
|---|---|---|
| $C_1$ | $I_{11}, I_{12}, I_{13} \ldots$ | $F_{111}, F_{112}, F_{113} \ldots$ |
| $C_2$ | $I_{21}, I_{22}, I_{23} \ldots$ | $F_{211}, F_{212}, F_{213} \ldots$ |

TABLE 1-continued

| Known category No. | Set of sampling images | Key feature point (descriptor) |
|---|---|---|
| $C_3$ | $I_{31}, I_{32}, I_{33} \ldots$ | $F_{311}, F_{312}, F_{313} \ldots$ |
| $\ldots$ | $\ldots$ | $\ldots$ |
| $C_n$ | $I_{n1}, I_{n2}, I_{n3} \ldots$ | $F_{n11}, F_{n12}, F_{n13} \ldots$, | wherein $C_n$ represents the $n^{th}$ object category $C_1 \ldots C_n (n \leq N)$; $I_{n1} \ldots I_{nj}$ represents the $j^{th}$ image in the $n^{th}$ object category (j is the number of the images in the object category $C_n$); $F_{nj1} \ldots F_{njf}$ represents the $f^{th}$ SIFT key feature point in each image $I_{nj}$, wherein f is a natural number no less than 1.

Here, other image feature extracting methods can be used as alternative schemes to the SIFT algorithm, e.g., a SURF algorithm or a PCA (Principal Component Analysis)-SIFT algorithm, etc., and these algorithms are applicable to the present invention.

Cluster Analyzing Step S2

After extracting the feature of each sampling image, i.e., the low-level visual feature, step S2 of cluster analyzing step is proceeded with (see FIG. 1). All the key feature points (i.e., descriptors) extracted from all sets of sampling images for all the categories are cluster analyzed and a tree-like structure is constructed. The tree-like structure may be construed using the k-tree structure. The step S2 may be implemented with the following specific method (see FIG. 4).

Figure 4:
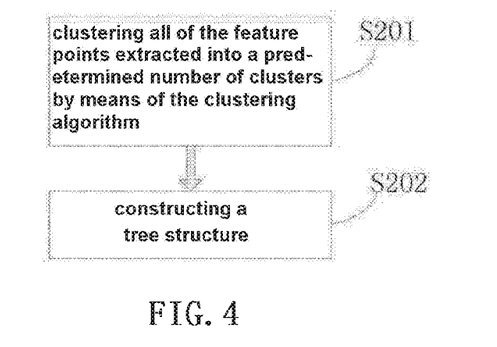
FIG. 4 is a detailed flowchart of the clustering analyzing method according to one embodiment of the present invention.

All SIFT key feature points included in all sampling images for all the object categories obtained are clustered into a predetermined number of clusters (step S201) with a clustering algorithm. The clustering process retrieves general commonness among each category self-adaptively, while distinguishing different categories largely. A commonly known and used clustering algorithm may be used, e.g., k-means. For the k-means clustering algorithm, the following documents may be referred to: MacQueen, J. B., Some methods for classification and analysis of multivariate observations, in Proc. 5th Berkeley Symp. Mathematical Statistics and Probability, 1967, pp. 281-297. The detailed introduction at the following websites may be further referred to, and these contents are incorporated into the document by citation.

1. http://www.cnblogs.com/jerrylead/archive/2011/04/06/2006910.html
2. http://wenku.baidu.com/view/179d21a4f524ccbff1218482.html Other clustering methods can also be applied to the present invention, as long as it may categorize spatially adjacent data into the same category. Alternative clustering algorithms include but are not limited to: a k-modes algorithm, a k-Prototype algorithm, a hierarchical clustering method, a maximum distance sampling method, an ant colony clustering algorithm, a fuzzy clustering algorithm, etc.

In this case, the present invention depicts the clustering process using the k-means algorithm as an example. The k-means algorithm categorizes n data objects into k clusterings, i.e., k clusters, based upon a preset k value. Objects in the same cluster have a high similarity, whereas objects in different clusters have a low similarity. The clustering similarity is computed by means of a "center object" (center of gravity) obtained by an average of data objects in each clustering. For example, in the present invention, where the known and preset number of the object categories is N, the range of k is $k \in (1, N)$, or k is smaller than the total number of feature points that participates in clustering. In the present embodiment, it is selected that k∈(1,10) and usually k is no more than 10. Selection of k may be determined based upon an optimal value obtained via experience or tests according to actual needs.

The working process of the k-means algorithm is as follows: selecting k objects randomly as the initial clustering centers from x data objects first; for the remaining other data objects, allocating them to clustering centers most similar with them (nearest in spatial distance) respectively based upon their similarities (spatial distances) with the clustering centers.

Specific to the embodiment of the present invention, a set of descriptors of all the key feature points extracted from all the images are cluster analyzed. Here, in the initial stage of k-means clustering, clustering centers can be determined randomly first. For example, when it is selected that k=2, the descriptors of two key feature points are selected randomly as the initial clustering centers. By computing the Euclidean distance between the descriptors of the key feature points that newly join in and the preselected two initial clustering centers, the descriptors of the key feature points that newly join in are attributed to the category (i.e., cluster) that has the minimum Euclidean distance. Thus, through an iterative approach for example, all of the feature points are traversed until all the feature points or descriptors are involved in the clustering and eventually all the key features extracted are clustered into two clusters around the two initial clustering centers. Then, averages (averages of the descriptor vectors) of all the descriptors in each cluster are recomputed for the two clusters to obtain a new clustering center. Further, the clustering center newly obtained and the previous (adjacent previous) clustering center are compared to compute the difference (for example, variance) between them. When the difference is zero or reaches a predetermined threshold, the clustering process can be terminated. Otherwise, the new clustering center determined by the current iteration can be used as the initial clustering center for a next iteration to readjust the clustering center constantly. The aforesaid iterating or clustering process can be repeated until the clustering center does not change or changes slightly (i.e., meets a preset threshold).

Specifically, a standard measure function can be used to determine whether an iterating process meets the convergence conditions to determine whether the iterating process can be terminated. In the embodiment of the present invention, when k=2, the standard measure function can be defined as summing an absolute value of a difference between each SIFT descriptor component and a respective component of the clustering center descriptor obtained. When the sum is greater than a certain value or the number of iterations is greater than a predetermined number, the clustering iterating process is terminated.

To reduce the time complexity of computing, the following can be also selected as the standard measure function: computing an absolute value of the difference between the current clustering center and the previous clustering center for each category, and then computing a sum of the absolute values of all the categories. When the sum is smaller than a certain threshold, the iteration is terminated.

A tree-like structure of the key feature points (or descriptors), i.e., a k-tree, may be constructed (step S202) simultaneously when or after the clustering algorithm is performed. Thus, the cluster analyzing function in the step S2 can be realized by combining steps S201 and S202 into one step or functional module in a specific embodiment.

Specific to one embodiment, taking k=2 (i.e., a binary tree) for example, all the low-level visual features of all the sampling images of the object category, i.e., the SIFT key feature points in the embodiment above, are constructed into a root node n1 of the binary tree, and the aforesaid cluster analysis is performed on all the key feature points in n1.

A set of clusterings having a relatively greater number of key feature points in the node n1 after the clustering serves as a left child n2 of the root node n1, whereas a set of clusterings having a relatively smaller number of key feature points in the node serves as a right child n3 of n1. The rest is done in the same manner, further cluster analysis is performed on n2 and n3 respectively until the number of the leaf nodes of the binary tree is equal to the known and preset total number N of the object categories, i.e., having the final number of leaf nodes be N. In other words, the whole key feature points of all the images in all the object categories are divided into N subsets.

Taking k=2 for example, the structure chart of the binary tree constructed finally is as follows:

Assuming that each node of the k-tree constructed in the step S2 is expressed as follows:

$$ni(C_1, I_{11}, F_{111} \ldots F_{11f}, f_{11}, \ldots I_{1f}, F_{1f1} \ldots F_{1jf},$$
$$f_{1f}, \ldots ; C_n, I_{n1}, F_{n11} \ldots F_{n1f}, f_{n1}, \ldots , I_{nj},$$
$$F_{nj1} \ldots F_{njf}, f_{nj}),$$

wherein ni denotes the $i^{th}$ leaf node of the k-tree, the object categories denoted by the SIFT key feature points stored in the node are $C_1 \ldots C_n$ (n≤N), the images in each object category are denoted as $I_{n1} \ldots I_{nj}$ (j is the number of the images in the object category $C_n$), the SIFT key feature points clustered as the node ni in each image $I_{nj}$ are $F_{nj1} \ldots F_{njf}$, $f_{nj}$ is the number of the SIFT key feature points clustered as the $ni^{th}$ leaf node in the $j^{th}$ image in the $n^{th}$ (1≤n≤N) object categories (i.e., $C_n$).

Thus, all the key feature points in all the sampling images are allocated or divided into the N leaf nodes or subsets. No repeated key feature points are included among the N leaf nodes, i.e., there are no intersections between every two leaf nodes, but key feature points of images of another category may be mixed or included in every leaf node.

Object Category Determining and Set of Common Feature Points Searching Step S3

For removing images that do not belong to the category from each node ni to limit accurately the category to which a sampling image belongs, the present invention further comprises a step S3 of determining an object category and searching common features for each image included in each object category (see FIG. 1).

Figure 5:
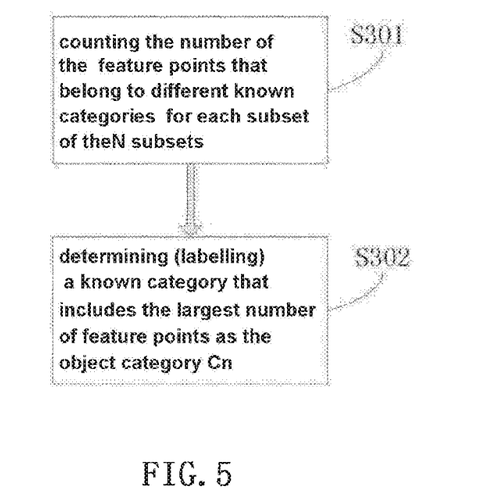
FIG. 5 is a detailed flowchart of the step S3 according to one embodiment of the present invention.

The specific implementing methods or steps for the step S3 is depicted below with reference to FIG. 5.

Step S3 (for determining an object category): analyzing each leaf node or subset of the tree-like structure obtained in the previous step S2 with reference to the "known category—set of sampling images—key feature point and descriptor" correspondence table obtained in the preceding step to determine the category to which each leaf node should belong so as to remove those images that do not belong to the object category therefrom.

The specific implementing process is as follows: computing or counting the total number of the SIFT key feature points allocated to the $ni^{th}$ leaf node and belonging to different known categories based upon the "known category—set of sampling images—key feature point and descriptor" correspondence table obtained in the preceding step (S301):

$$\text{class\_number\_SIFT}(C_n) = f_{n1} + f_{n2} + \ldots + f_{nj}$$

The category having the greatest number of SIFT key feature points in each leaf node obtained with reference to the "known category—set of sampling images—key feature point and descriptor" correspondence again is:

$$\text{node\_class\_label}(m) = \max(\text{class\_number\_SIFT}(C_n))$$

The object category $C_n$ is labelled or identified as the category having the greatest total number of key feature points in the leaf node (S302). If the category has been labelled or allocated to another leaf node before, the category having a less total number of SIFT key feature points is selected for labelling. The rest is done in the same manner to label the category for each leaf node. For example, assuming a certain leaf node involve the known categories numbered as 1.5.8.9, and the total numbers of the SIFT feature points of the images included in the corresponding categories are 10.25.15.35 respectively, the order according to the total number of the SIFT feature points is 9(35).5(25).8(15).1(10). Accordingly, the category number (i.e., "9") having the greatest feature points is allocated or labelled to the leaf node. However, if the category number 9 has been allocated to another leaf node before, the category number 5 (i.e., having the less total number of key feature points) is successively allocated to the current leaf node. Assuming that number 5 has also been allocated to another leaf node, number 8 is selected for labelling the leaf node. The rest is done in the same manner until all the leaf nodes are labelled.

By now for each object category $C_n$, the category to which it belongs has been labelled or identified. However, in practice, a subset of images in the object category includes more than one image, and a certain sampling image includes some redundant feature elements. For example, in a "computer"-like set of sampling images obtained in training, unlike other "computer"-like sampling images, one of the "computer"-like sampling images further includes a "sound box" redundant feature element. That is, through the cluster analyzing process, some redundant feature points or elements that cannot represent the main features of the object category are inevitably mixed in each object category. Besides, even for the images in the same category, due to interference of a shooting angle, light, and the like factors, depictions of the same feature point are different, and these elements will influence correct categorization and automatic recognition of images by the computer.

To this end, the computer must clarify common features among images for each category to eliminate influence of these interfering factors as much as possible.

To this end, the present invention further comprises a step S4 of acquiring common features among each image included in each object category $C_n$.

Figure 6:
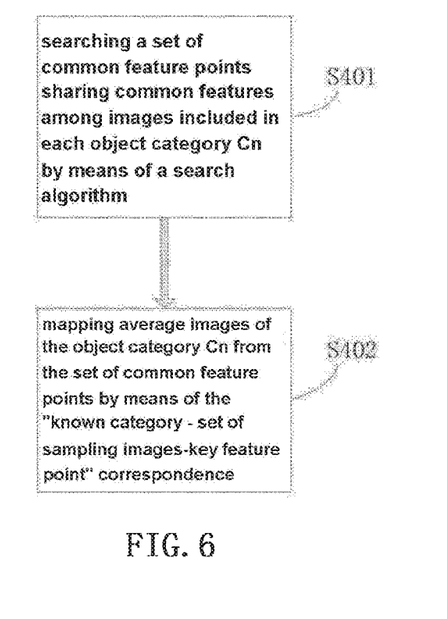
FIG. 6 is a detailed flowchart of the step S4 according to one embodiment of the present invention.

The step S4 is depicted with reference to FIG. 6. Specifically, the step S4 at least comprises: extracting a set of common feature points (hereinafter the set of common feature points) among each image for each object category $C_n$ (step S401), and/or additionally mapping representative typical images corresponding to these common features by means of the "known category—set of sampling images—key feature point and descriptor" correspondence table (S402), thereby not only causing the computer to clarify common features of each object category $C_n$, providing basis for confirming with labor whether the autonomous recognition with the computer as to the object category $C_n$ is correct, but also providing accurate and optimal comparison reference for a succeeding accurate on-line recognition of the object category while significantly reducing the amount of computation.

First, a corresponding set of images labelled as the category $C_n$ in each leaf node is selected, and the set of images is expressed as follows:

Step S401: retrieving common features for each object category $C_n$. When low-level visual features of an image serve as depictions of the image, a set of key feature points among each image in each object category $C_n$ can be selected to express the common features of the object category. In order to reduce the amount of computation or search, the least number of common feature points to be retrieved in each object category $C_n$ can be determined by the following steps:

The number of the respective SIFT key feature points and the number of the feature points of each image are expressed as follows:

$$I(C_n) = \{I_{n1}, F_{n11} \ldots F_{n1f_{n1}}, \ldots, I_{nj}, F_{nj1} \ldots F_{njf_{nj}}\},$$

wherein $f_{nj}$ is the number of the SIFT key feature points labelled as $C_n$ in the image $I_{nj}$.

Since the number of common feature points among each image for each object category $C_n$ is inevitably no more than the number of feature points in the image having the least number of feature points, the minimum number $K(C_n)$ of common feature points can be determined in the following simplified manner. For example, with reference to the "known category—set of sampling images—key feature point and descriptor" correspondence, the number of the SIFT key feature points labelled as the category $C_n$ in each image in each object category $C_n$ can be counted, and the minimum therein can be selected:

$$K(C_n) = \min(f_{n1}, f_{n2}, \ldots, f_{nj})$$

Accordingly, the number range of key feature points sharing common features in the object category (or set of images $I(C_n)$) can be determined first in number. However, the steps above can only clarify the number of common feature points included in each object category $C_n$, these feature points and the images to which they belong respectively cannot be determined.

A search algorithm, such as a KNN (k-Nearest Neighbor algorithm) nearest neighbor search algorithm (Hastie, T. and Tibshirani, R. 1996. Discriminant Adaptive Nearest Neighbor Classification. IEEE Trans. Pattern Anal. Mach. Intell. (TPAMI) 18,6 (June. 1996), 607-616., where is incorporated into the document herein by reference), can be used to find out a set of common feature points sharing common features in each image included in each object category $C_n$ and a corresponding set of images of these common feature points.

In an example of using the KNN search algorithm, the specific steps are as follows: assuming the vector center of all sets of SIFT feature points included in the category labelled as $C_n$ in the set of representative images $I(C_n)=\{I_{n1}, I_{n2}, \ldots, I_{nj}\}$ obtained in the preceding step is centre($C_n$), the vector center can be obtained by computing an average vector of descriptors of all SIFT feature points labelled in the set of representative images:

$$centre(C_n) = \frac{1}{(f_{n1} + f_{n2} + \ldots + f_{nj})}(F_{n11} + \ldots + F_{n1f} + \ldots + F_{nj1} + F_{njf})$$

The Euclidean distance Dis($F_{nif}$,centre($C_n$)) between the descriptor of the SIFT key feature point labelled in the set of representative images of the object category and the vector center centre($C_n$) is computed (step S401).

The commonly known and used KNN nearest neighbor search algorithm, or other common sorting algorithms can be used to obtain the K($C_n$) SIFT key feature points nearest to the vector center centre ($C_n$), and denoted as KNN(F) to retrieve K($C_n$) feature points nearest to the vector center centre ($C_n$). The K($C_n$) key feature points and their respective sampling images to which they belong to can be determined and retrieved by means of the "known category—set of sampling images—key feature point and descriptor" correspondence obtained previously.

Thus, with the above algorithm, a set of common feature points sharing common features among each image in each object category $C_n$ (or referred as a set of common feature points in object category $C_n$) can be obtained, and used directly as the comparison basis or foundation in a subsequent step S5.

However, for purposes of verifying correctness of the computer autonomous learning or comparing images visually, sometimes it is necessary to find out a set of sampling images corresponding to the K($C_n$) key feature points or the largest subset thereof. To this end, the present invention further comprises a step S402: further searching a set of images including the K($C_n$) feature points from the set of images of the object category $C_n$ or its largest subset based upon the K($C_n$) feature points found out in the preceding step and the "known category—sampling image—feature point" correspondence to use the largest subset of sampling images including the K($C_n$) feature points as average images or a set of images of the objet category obtained via the machine autonomous learning.

Additionally but not necessarily, the minimum distance (min_dis($C_n$)) of the K($C_n$) common feature points to the vector center centre($C_n$) of the object category can be obtained, and used as the basis for delimiting a similarity threshold range of compared images in the subsequent step S5, wherein the distance denotes the similarity among points in space, and the minimum distance means that the image can depict general commonness of the object category best. The minimum distance is expressed as:

$$min\_dis(C_n)=min(Dis(F_{nif},centre(ni))).$$

Via the off-line processing in Part I above, by off-line training of samplings on a certain amount of known images, a computer has completed the process of recognizing the object category autonomously, and extracted a set of common feature points sharing common features among each image included in each object category $C_n$, and corresponding average images or set of images from all the sampling images. The average images or set of images are used as the basis and foundation in the subsequent on-line object category recognizing process (i.e., Part II).

Figure 7:
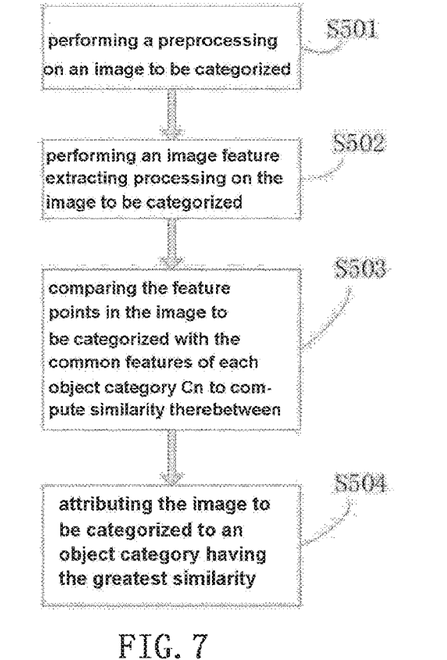
FIG. 7 is a main flowchart of the online (Part II) image category recognition method of the present invention.

Part II: on-line image recognition and categorization. FIG. 7 illustrates one implementing manner of the step S5.

After the set of common feature points among images included in each object category $C_n$ or corresponding average images or set of images are obtained, the set of common feature points or average images can be connected to a corresponding network or placed in any platform or location desired to further realize automatic recognition of an image to be categorized.

For example, assuming that a new image to be categorized is obtained via a network or by other means, the new image is not categorized or the category to which it belongs is not identified, and it is desired that the image to be categorized is categorized autonomously into the aforesaid known N images (or N types of commodities).

To this end, the present invention performs the same processing on the new image to be categorized as the preprocessing step and the image feature extracting step S1 in Part I. Specifically with reference to FIG. 7, step S501 is performed optionally. Where necessary, the same preprocessing as the preceding steps S001-S003 is performed on the new image.

Step S502: extracting low-level visual features from the image to be categorized using the same image feature extracting method as used in the step S1 in Part I, i.e., extracting key feature points and descriptors of the image to be categorized.

Step S503: comparing the image to be categorized with the common features of each object category obtained in the Part I to determine (compute) similarity therebetween. Subsequently, the image to be categorized is allocated (attributed) to an object category having the greatest similarity (step S504).

Specifically, the key feature points and descriptors extracted from the image to be categorized are compared directly with the set of common feature points for each object category obtained previously, or with the key feature points in the average images in each object category, to measure similarity between the image to be categorized and each sampling image, and allocating the image to be categorized to the category with the greatest similarity.

Specific to the present invention, if similarity is measured with the SIFT algorithm and using the Euclidean distance, and the set of common feature points for each object category is selected as the comparison basis, all the SIFT key feature points extracted from the image to be categorized are compared with each SIFT key feature point included in the set of common feature points for each object category one by one to compute the Euclidean distance Dis($F_{Ri}$, $F_{Ai}$) therebetween, wherein $F_{Ri}$ is the $i^{th}$ SIFT key feature point in the image to be recognized, $F_{Ai}$ is the $i^{th}$ SIFT key feature point in the set of common feature points of the object category.

The advantage of directly selecting a set of common feature points for each object category as the comparison basis lies in reducing the amount of computation and shortening time for computation significantly. However, the problem is that since the set of common feature points is the refined depiction of the common features of the object category, possibly a large amount of feature points that should belong to the category are removed. For example, due to interference of a shooting angle, light, and the like factors, depictions about the feature points that should have belonged to the same feature are different, and the feature points are not attributed into the set of common feature points, thereby influencing correct categorization and recognition of an image to be categorized by the computer.

Therefore, it is preferred in the present invention that an image to be categorized is compared with average images or set of images of each object category, rather than use a set of feature points for each object category as the comparison basis. At that time, all SIFT key feature points extracted from the image to be categorized are compared with all SIFT key feature points (i.e., a full set of key feature points in each image) in each image among average images in each object category one by one, and the Euclidean distance $Dis(F_{Ri}, F_{Ai})$ therebetween is computed, wherein $F_{Ri}$ is the $i^{th}$ SIFT key feature point in the image to be identified, and $F_{Ai}$ is the $i^{th}$ SIFT feature point in the average images of the object category.

Subsequently, the number of key feature points that meet the threshold conditions is counted, and the category having the greatest number of feature points that meets the predetermined conditions can be determined as the category to which the image to be categorized belong.

The specific implementing process is as follows:

(1) For the $n^{th}$ object category $C_n$, if $Dis(F_{Ri}, F_{Ai})<T1$, wherein T1 is a preset threshold, the score of the category is $score(C_n)$ plus 1, wherein $T1=\varepsilon*min\_dis(C_n)$. Herein, $\varepsilon$ denotes the weight, which is set mainly for reducing the amount of computation and thus not necessary. As long as the amount of computation is not large, $\varepsilon$ may be omitted. And $min\_dis(C_n)$ is the minimum distance to the vector center $centre(C_n)$ obtained previously after the step S402. In the present invention, an optimal value for the weight c is obtained according to tests. It is found in the testing process that when $\varepsilon \in \varepsilon[1.5, 2.3]$, a better effect is achieved. In a more preferred embodiment of the present invention, when it is selected that $\varepsilon=1.8$, a higher recognition accuracy can be obtained.

(2) Subsequently, for each object category, if $score(C_n) > K(C_n)$ the category is used as a candidate recognized category of the image to be recognized. Finally, $score(C_n)$ is sorted in a descending order, and the object category sorted as the first one is the category of the object in the image to be recognized.

Other minimum distances preset or obtained by other means can be selected to replace the $min\_dis(C_n)$ to the vector center $centre(C_n)$ to serve as the basis for the distance comparison. For example, the minimum Euclidean distance $Dis(F_{Ri}, F_{Ai})$ between each feature point in the image to be categorized and each feature point in a set of common feature points or each feature point in average images can be selected to replace $min\_dis(C_n)$, and may be 0 or a non-zero value.

As long as similarity among images can be measured accurately, other methods for measuring image similarity may be used. For example, a Mahalanobis distance, a city distance, etc. can be selected to replace the aforesaid Euclidean distance computing method.

Figure 8:
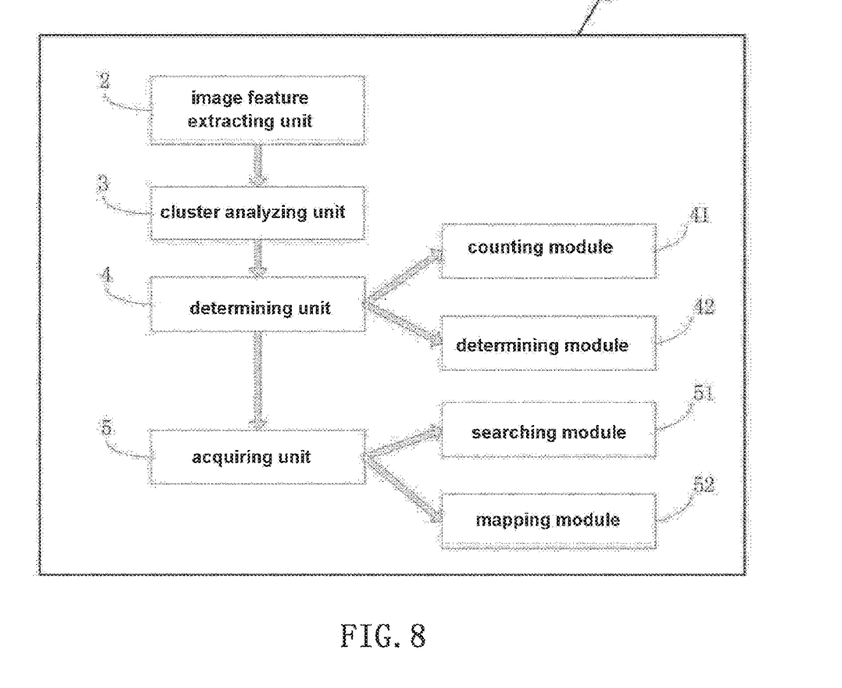
FIG. 8 is a block diagram of an image object category recognition device of the present invention.

FIG. 8 shows one embodiment of the image object category recognition device according to the present invention. The image object category recognition device 1 comprises:

an image feature extracting unit 2 configured to extract feature points of all sampling images in N known categories with a feature point extracting method, where N is a natural number greater than 1, each category comprises at least one sampling image, and a known category—sampling image—feature point correspondence is established;

a cluster analyzing unit 3 configured to perform cluster analysis on all of the feature points extracted using a clustering algorithm, and dividing the feature points into N subsets;

a determining unit 4 for determining an object category $C_n$ for each of the subsets;

an acquiring unit 5 for acquiring common features among the images included in each object category $C_n$ with a search algorithm, where $c_n$ is the $n^{th}$ object category, and n is a positive integer no more than N.

In addition, the determining unit 4 is configured to include at least the following modules: a counting module 41 for counting a number of the feature points that belong to different known categories for each subset of the N subsets; and a determining module 42 for determining a known category that includes the largest number of feature points as the object category $C_n$.

The acquiring unit 5 is configured to include at least the following module: a searching module 51 for searching a set of common feature points sharing common features among images included in each object category $C_n$ by means of a search algorithm. So as to remove redundant feature points that do not belong to the object category $C_n$.

Preferably, the acquiring unit 5 is further configured to include: a mapping module 52 for additionally mapping sampling images having the largest number of common feature points among the set of common feature points from the each object category $C_n$ by means of the known category—sampling image—feature point correspondence, and using the sampling images as average images of the object category $C_n$.

Figure 9:
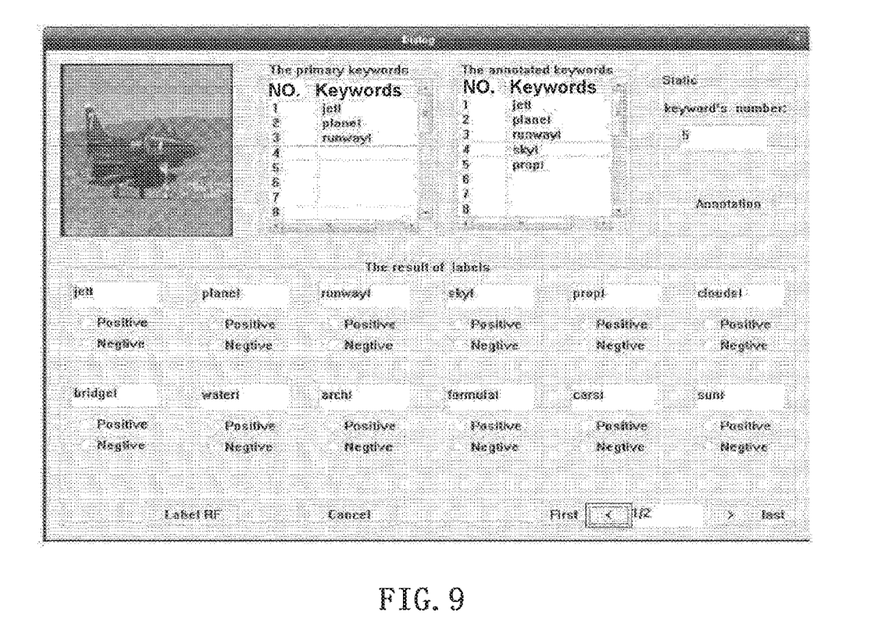
FIG. 9 is a specific example of offline automatic image identification with a computer.

FIG. 9 shows a specific schematic comparison result of image recognition, which includes labor and computer recognition results. The image object category recognizing process in Part I of the present invention is similar with it. The three blocks from the left to the right on the top represent respectively the following regions: 1. images for a computer to perform an autonomous object category recognition (including a plane in the background); 2. the category of image recognized with the labor and the feature (key word) extraction result; 3. the object category recognized via the computer algorithm autonomous learning and the corresponding feature (key word) extraction result.

Figure 10:
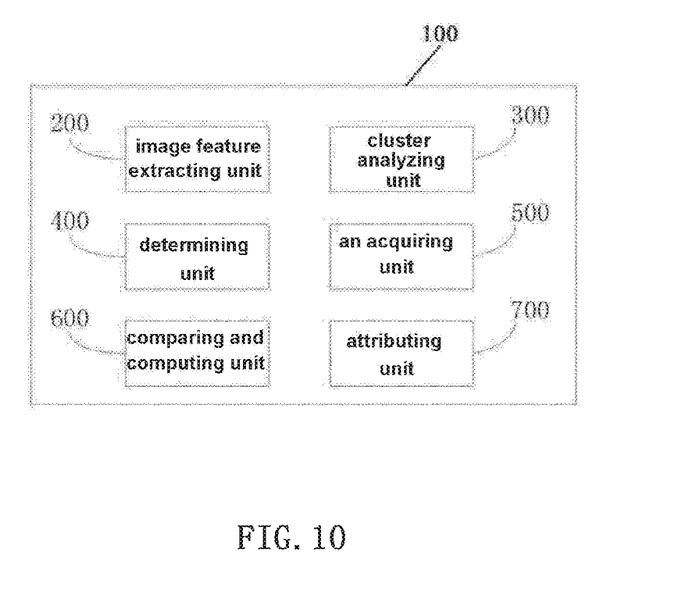
FIG. 10 is a block diagram of the image recognition system comprising the image object category recognition device of the present invention.

FIG. 10 shows a block diagram of an exemplary embodiment of an image recognition system 100 comprising the aforesaid image object category recognition device. The system 100 at least comprises: an image feature extracting unit 200, a cluster analyzing unit 300, a determining unit 400, and an acquiring unit 500, wherein the determining unit 400 can comprise at least the following functional modules: a counting module and a determining module. The acquiring unit can comprise at least: a searching module and/or a mapping module, etc. These units or modules implement the functions of the units shown in FIG. 8 respectively, which is not repeated here.

Moreover, to achieve automatic category recognizing function in Part II of the present invention, the aforesaid image recognition system 100 can further comprise a comparing and computing unit 600 for comparing each feature point extracted by the image feature extracting unit 200 from the image to be categorized with each feature point in a set of common feature points for each object category or in average images of each object category one by one with an image similarity measure algorithm to compute similarity between the feature point of the image to be categorized and the feature point of each object category; and an attributing unit 700 for attributing the image to be categorized to an object category $C_n$ having the greatest similarity.

The system 100 includes at least one processor which can be programmed to perform the aforesaid image object category recognition method. Or the processor can comprise software, firmware or hardware and/or a combination thereof for realizing the aforesaid functional modules and/or the combination thereof.

The embodiments of the present invention have been fully implemented in the visual studio 2010 compiling platform provided by Windows, and are applicable to applications for network marketing etc., or other applications that need categorize images.

The foregoing is only preferred embodiments of the present invention, and not intended to limit the present invention. Any modifications, equivalent substitutions, improvements, etc. within the spirit and principle of the present invention should be included in the protection scope of the present invention.

The invention claimed is:

1. An image object category recognition method, comprising the following steps:
    an image feature extracting step (S1) of extracting feature points of all sampling images in N known categories with a feature point extracting method, and establishing a known category—sampling image—feature point correspondence, where N is a natural number greater than 1, and each category comprises at least one sampling image;
    a cluster analyzing step (S2) of performing cluster analysis on all of the feature points extracted using a clustering algorithm, and dividing the feature points into N subsets;
    an object category determining step (S3) of determining an object category $C_n$ for each of the subsets;
    a common feature acquiring step (S4) of acquiring common features among the images in each object category $C_n$ with a search algorithm, where $C_n$ is the $n^{th}$ object category, and n is a positive integer no more than N,
    wherein the step S4 comprises at least the following sub-steps:
    S401 of searching a set of common feature points sharing common features among images included in each object category $C_n$ by means of the search algorithm; and
    S402 of additionally mapping sampling images having the largest number of common feature points among the set of common feature points from the each object category $C_n$ based upon the set of common feature points searched by means of the known category—sampling image—feature point correspondence, and using the sampling images as average images of the object category $C_n$; and
    after the step S4, an on-line image recognizing and categorizing step S5 of recognizing and categorizing an image to be categorized by comparing the image to be categorized with at least one of the common feature points among the images in each object category $C_n$ and the key feature points in the average images in each object category $C_n$.

2. The method according to claim 1, wherein the step S1 comprises at least the following sub-steps:
    S101 of extracting the feature points among low-level visual features of each of the sampling images;
    S102 of acquiring a vector description for each of the feature points; and
    S103 of establishing a known category—sampling image—feature point correspondence.

3. The method according to claim 2, wherein the step S2 comprises at least the following sub-steps:
    S201 of clustering all of the feature points extracted into a predetermined number of clusters by means of the clustering algorithm; and
    S202 of constructing the clusters into a k-tree structure, wherein k is a positive integer, and k∈(1, N).

4. The method according to claim 3, wherein the step S3 comprises at least the following sub-steps:
    S301 of counting a number of the feature points that belong to different known categories for each subset of the N subsets; and
    S302 of determining a known category that includes the largest number of feature points as the object category $C_n$.

5. The method according to claim 1, wherein a number of common feature points ($K(C_n)$) in the set of common feature points is determined based upon a number of feature points of an image having the smallest number of feature points in the object category $C_n$.

6. The method according to claim 1, wherein the on-line image recognizing and categorizing step S5 comprises:
    S502 of performing the same image feature extracting processing on the image to be categorized as the step S1 to extract feature points of the image to be categorized;
    S503 of comparing the feature points extracted from the image to be categorized with each of the common features of the each object category $C_n$ among the n object categories to compute similarity between the image to be categorized and each object category respectively; and
    S504 of attributing the image to be categorized to an object category $C_n$ having the greatest similarity.

7. The method according to claim 1, wherein the on-line image recognizing and categorizing step S5 comprises:
    S502 of performing the same image feature extracting processing on the image to be categorized as the step S1 to extract feature points of the image to be categorized;
    S503' of comparing each of the feature points extracted from the image to be categorized with each feature point in average images of the object category one by one to calculate similarity between the image to be categorized and each average image of the object category respectively; and
    S504 of attributing the image to be categorized to an object category $C_n$ having the greatest similarity.

8. The method according to claim 1, wherein prior to the step S1, further comprising an image preprocessing step for each image, the image preprocessing step comprising:
    S001 of scaling proportionally the image;
    S002 of performing a filtering processing on the image scaled proportionally to remove noise; and
    S003 of performing a graying processing on the image filtering processed.

9. The method according to claim 1, wherein,
    the feature point extracting method is a SIFT algorithm, with which SIFT key feature points of each image and SIFT descriptors of each key feature point are extracted;
    the clustering algorithm is a k-means algorithm, and the key feature points are divided into the N subsets by constructing the k-tree, where k is a positive integer and k∈(1, N); and
    the search algorithm is a KNN nearest neighbor search algorithm.

10. An image object category recognition device, comprising:

an image feature extracting unit configured to extract feature points of all sampling images in N known categories with a feature point extracting method, and establish a known category—sampling image—feature point correspondence, where N is a natural number greater than 1, each category comprises at least one sampling image;

a cluster analyzing unit configured to perform cluster analysis on all of the feature points extracted using a clustering algorithm, and dividing the feature points into N subsets;

a determining unit for determining an object category $C_n$ for each of the subsets;

an acquiring unit for acquiring common features among the images included in each object category $C_n$ with a search algorithm, where $C_n$ is the $n^{th}$ object category, and n is a positive integer no more than N, wherein the acquiring unit includes at least the following sub-modules:

a searching module for searching a set of common feature points sharing common features among images included in each object category $C_n$ by means of the search algorithm; and a mapping module for mapping sampling images having the largest number of common feature points among the set of common feature points from the each object category $C_n$ by means of the known category—sampling image—feature point correspondence, and using the sampling images as average images of the object category $C_n$;

an on-line image recognizing and categorizing unit for recognizing and categorizing an image to be categorized by comparing the image to be categorized with at least one of the common feature points among the images in each object category $C_n$ and the key feature points in the average images in each object category $C_n$.

11. The device according to claim 10, wherein the determining unit comprises at least the following sub-modules:

a counting module for counting a number of the feature points that belong to different known categories for each subset of the N subsets; and a determining module for determining a known category that includes the largest number of feature points as the object category $C_n$.

12. The method according to claim 1, wherein the on-line image recognizing and categorizing step S5 comprises:

an extracting step of performing the same image feature extracting processing on the image to be categorized as the step S1 to extract low-level visual features from the image to be categorized;

a comparing and computing step of comparing each feature point extracted from the image to be categorized with each feature point in a set of common feature points for each object category or in average images of each object category one by one with an image similarity measure algorithm to compute similarity between the feature points of the image to be categorized and the feature points of each object category; and an attributing step of attributing the image to be categorized to an object category having the greatest similarity.

13. An image recognition system comprising at least a processor configured to comprise at least the following functional units:

an image feature extracting unit configured to extract feature points of all sampling images in N known categories with a feature point extracting method, and establish a known category—sampling image—feature point correspondence, where N is a natural number greater than 1, each category comprises at least one sampling image;

a cluster analyzing unit configured to perform cluster analysis on all of the feature points extracted using a clustering algorithm, and dividing the feature points into N subsets;

a determining unit for determining an object category $C_n$ for each of the subsets; and an acquiring unit for acquiring common features among the images included in each object category $C_n$ with a search algorithm, where $C_n$ is the $n^{th}$ object category, and n is a positive integer no more than N, wherein the acquiring unit is configured to comprise at least the following modules:

a searching module for searching a set of common feature points sharing common features among images included in each object category $C_n$ by means of a search algorithm; and a mapping module for additionally mapping sampling images having the largest number of common feature points among the set of common feature points from the each object category $C_n$ based upon the set of common feature points searched by means of the known category—sampling image—feature point correspondence, and using the sampling images as average images of the object category $C_n$; and an on-line image recognizing and categorizing unit for recognizing and automatically categorizing an image to be categorized by comparing the image to be categorized with at least one of the common feature points among key feature points in the average images in each object category $C_n$.

14. The system according to claim 13, wherein the determining unit is configured to comprise at least the following modules:

a counting module for counting a number of the feature points that belong to different object categories $C_n$ for each subset of the N subsets; and a determining module for labelling the object category $C_n$ with a category that includes the largest number of feature points.

15. The system according to claim 13, wherein the on-line image recognizing and categorizing unit uses the image feature extracting unit to extract feature points from the image to be categorized and wherein the on-line image recognizing and categorizing unit is configured to comprise at least the following modules:

a comparing and computing unit for comparing each feature point extracted from the image to be categorized with each feature point in the set of common feature points for each object category or in average images of each object category one by one with an image similarity measure algorithm to compute similarity between the feature points of the image to be categorized and the feature points of each object category; and an attributing unit for attributing the image to be categorized to an object category $C_n$ having the greatest similarity.

* * * * *